United States Patent
Huang et al.

(10) Patent No.: US 11,616,392 B1
(45) Date of Patent: Mar. 28, 2023

(54) LIGHT ENERGY AND RF ENERGY HARVESTING RECTIFIER CIRCUIT AND CORRESPONDING RECTIFICATION METHOD THEREOF

(71) Applicant: National Cheng Kung University, Tainan (TW)

(72) Inventors: Tzuen-Hsi Huang, Tainan (TW); Dong-Yan Li, Tainan (TW); Yi-Yuan Lin, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 17/855,833

(22) Filed: Jul. 1, 2022

(51) Int. Cl.
*H02J 50/00* (2016.01)
*H02J 50/40* (2016.01)
*H02J 50/30* (2016.01)
*H02J 50/20* (2016.01)

(52) U.S. Cl.
CPC ............ *H02J 50/001* (2020.01); *H02J 50/20* (2016.02); *H02J 50/30* (2016.02); *H02J 50/40* (2016.02)

(58) Field of Classification Search
CPC .......... H02J 50/001; H02J 50/20; H02J 50/30; H02J 50/40; H02J 50/80
See application file for complete search history.

(56) References Cited

U.S. PATENT DOCUMENTS

| | | | |
|---|---|---|---|
| 9,197,143 B1* | 11/2015 | Townsend | H02J 50/001 |
| 10,116,170 B1* | 10/2018 | Leabman | H02J 50/20 |
| 2008/0054638 A1* | 3/2008 | Greene | H02J 50/001 290/1 R |
| 2012/0032518 A1* | 2/2012 | Huang | H02J 50/30 307/81 |
| 2016/0172873 A1* | 6/2016 | Hall | H02J 50/001 307/20 |
| 2016/0211742 A1* | 7/2016 | Mohammad | H02J 50/00 |
| 2019/0067963 A1* | 2/2019 | Haseltine | H02J 7/0048 |
| 2019/0252924 A1* | 8/2019 | Bito | H04M 19/08 |

* cited by examiner

*Primary Examiner* — Rexford N Barnie
*Assistant Examiner* — Joseph N Inge
(74) *Attorney, Agent, or Firm* — WPAT, PC

(57) ABSTRACT

The invention presents a rectifier circuit and a rectification method for harvesting light energy and RF energy, which uses light energy receiver to convert light energy into input direct-current voltage and RF energy receiver to convert RF energy into RF voltage simultaneously. Also, by combining with injection-locked oscillating circuit, oscillating frequency of injection-locked oscillating circuit is locked according to RF frequency also amplitude of RF voltage is enhanced. By using rectifier circuit to rectify and output corresponding output direct-current voltage, both light energy and RF energy may be harvested simultaneously and energy conversion efficiency is enhanced.

13 Claims, 3 Drawing Sheets

LIGHT ENERGY AND RF ENERGY HARVESTING RECTIFIER CIRCUIT AND CORRESPONDING RECTIFICATION METHOD THEREOF

FIELD OF THE INVENTION

A rectifier circuit and corresponding rectification method thereof, especially a light energy and RF energy harvesting rectifier circuit and corresponding rectification method thereof.

BACKGROUND OF THE INVENTION

In recent years, a number of energy harvesting techniques have been widely developed. Also, the demand for renewable energy has been much accounted among many fields worldwide at the same time period. Most of the research goals are aimed at reducing energy consumption and obtaining energy to a greater extent, including vibration, thermoelectricity, light energy and radio frequency (RF) energy conversion.

Light energy is collected by using conversion technology to convert solar energy in the environment into a collectable kind of energy. For example, photoelectric conversion, which converts light energy to electrical energy by using solar-cell panels. Wherein, solar-cell panels are a kind of power generation device which generates direct current while being exposed to sunlight. Most of solar cells made of semiconductor materials can serve as a power supply.

The conventional light energy harvesting circuit design uses solar-cell panels and/or solar cells as the conversion device, but these devices unavoidably have different conversion efficiencies varying along with the brightness of the light source. As usual, the saturated conversion efficiency is only about 22% in the sunny place outdoor. On the contrary, the conversion efficiency will drop sharply correspondingly in case of lacking sun light indoor. Thus, limited energy acquisition is unavoidable. Furthermore, if a solar-cell panel and/or a solar cell adopts inductive switch-type rectifier circuit, it is almost necessary to use at least one discrete choke coil element to realize the rectifier circuit. As a result, the realization of the overall circuit requires considerable volume and considerable construction cost.

Radio frequency (RF) energy becomes an energy source while the air is full of high-frequency signals among various frequency bands due to the advance of communication technology. RF energy may be obtained easily and may be safer operation for human in the modern society. Hence, it may be used as an input energy of an energy harvesting device.

The conventional RF energy harvesting circuit includes diode half-wave rectifier/full-wave rectifier/bridge rectifier circuit or switching rectifier circuit. However, this approach is affected by the surrounding environment. If the energy density of the RF electromagnetic wave is very small, the conversion efficiency of converting RF to DC (direct current) is correspondingly very low. In the past, the energy conversion efficiency of conventional RF energy harvesting circuits may be improved by using a specific high-power energy transmitter. However, the high-power electromagnetic wave radiation results in safety concerns, so the safety regulations are still limitations. Besides, the purpose of using a high-power energy transmitter is to compensate the path loss induced by the electromagnetic wave transmission distance, so the energy density reaching the receiving terminal(s) of the energy harvesting device is unavoidably low.

Accordingly, a single environmental energy source is still quite limited and may not meet the energy demand. Therefore, the diversity of environmental energy sources should be considered. The invention presents the light energy and RF energy harvesting rectifier circuit and harvesting rectification method so as to acquire light energy and RF energy simultaneously and to further enhance the conversion efficiency by using the injection-locked oscillating circuit to improve the RF conversion efficiency.

SUMMARY OF THE INVENTION

One main object of the invention is to present a light energy and RF energy harvesting circuit which uses both light energy receiver and RF energy receiver to combine with injection-locked oscillating circuit and also uses injection-locked oscillating circuit to lock corresponding oscillation frequency for enhancing conversion efficiency.

Another object of the invention is to present a light energy and RF energy harvesting method which receives light energy and RF energy simultaneously and also locks oscillation frequency by using RF frequency to improve conversion efficiency of mixed energy.

To achieve one above object, one embodiment of the invention discloses a light energy and RF energy harvesting rectifier circuit. The embodiment includes a first light energy receiver receiving and converting a light energy into a first input direct-current voltage, a second light energy receiver receiving and converting the light energy into a second input direct-current voltage, a RF energy receiver receiving and converting a RF energy into a RF voltage and a corresponding RF frequency, an injection-locked oscillating circuit being connected to both the first light energy receiver and the RF energy receiver respectively so as to receive the first input direct-current voltage, the RF voltage and the RF frequency and then use the first input direct-current voltage to drive the injection-locked oscillating circuit and lock an oscillation frequency in accordance with the RF frequency, and a rectifier circuit, which is connected to both the second light energy receiver and the injection-locked oscillating circuit respectively and includes a first diode rectifier, a second diode rectifier and a switch rectifier, wherein both the first diode rectifier and the second diode rectifier receive both the second input direct-current voltage and the RF voltage so as to rectify accordingly for generating and outputting a rectified voltage, wherein the switch rectifier receives both the rectified voltage and the oscillation frequency so as to adjust an RF amplitude of the rectified voltage accordingly for generating and outputting a corresponding output direct-current voltage to an output terminal.

To achieve one above object, another embodiment of the invention discloses a light energy and RF energy harvesting rectifier circuit. The embodiment includes a light energy receiver receiving and converting a light energy into a first input direct-current voltage and a second input direct-current voltage, a RF energy receiver receiving and converting a RF energy into a RF voltage and a corresponding RF frequency, an injection-locked oscillating circuit being connected to both the light energy receiver and the RF energy receiver respectively so as to receive the first input direct-current voltage and the RF frequency and then use the first input direct-current voltage to drive the injection-locked oscillating circuit and lock an oscillation frequency in accordance with the RF frequency when the first input direct-current voltage is not less than zero, and a rectifier circuit being connected to both the light energy receiver and the injection-locked oscillating circuit respectively so as to receive both the second input direct-current voltage and the RF voltage for rectifying accordingly and then generating and outputting a rectified voltage, wherein the rectifier circuit adjusts an RF amplitude of the rectified voltage according to the oscillation frequency for generating and outputting a corresponding output direct-current voltage to an output terminal.

In one preferred embodiment, the light energy receiver includes a first light energy receiver and a second light energy receiver, wherein the first light energy receiver receives and converts the light energy into a first input direct-current voltage and wherein the second light energy receiver receives and converts the light energy into a second input direct-current voltage.

In one preferred embodiment, a low pass filter is further used to be connected to the rectifier circuit, wherein the low pass filter having a cut-off frequency so as to filter out any harmonic component of the rectified voltage whose frequency is higher than the cut-off frequency and pass any direct current component of the rectified voltage.

In one preferred embodiment, a voltage-multiplying circuit is further used to be electrically connected to the rectifier circuit and the low pass filter respectively so as to receive and multiply the rectified voltage for generating and transmitting the multiplied voltage to the low pass filter. Wherein, the low pass filter filters out any harmonic component of the multiplied voltage whose frequency is higher than the cut-off frequency and passes any direct current component of the multiplied voltage.

In one preferred embodiment, the injection-locked oscillating circuit has a P-type metal-oxide-semiconductor field effect transistor cross-coupled oscillating circuit.

In one preferred embodiment, the rectifier circuit includes a first diode rectifier, a second diode rectifier and a switch rectifier, wherein both the first diode rectifier and the second diode rectifier receive both the second input direct-current voltage and the RF voltage so as to rectify accordingly for generating and outputting a rectified voltage, wherein the switch rectifier receives both the rectified voltage and the oscillation frequency so as to adjust an RF amplitude of the rectified voltage accordingly for generating and outputting a corresponding output direct-current voltage to an output terminal.

To achieve another above object, one embodiment of the invention discloses a light energy and RF energy harvesting rectification method. The embodiment includes these steps: converts a light energy into a first input direct-current voltage and a second input direct-current voltage by using a light energy receiver and also converting a RF energy into a RF voltage and a corresponding RF frequency by using a RF energy receiver, receive both the second input direct-current voltage and the RF voltage for rectifying accordingly and then generating and outputting a rectified voltage, uses the first input direct-current voltage to drive an injection-locked oscillating circuit and lock an oscillation frequency in accordance with the RF frequency when the first input direct-current voltage is not less than zero, and converting the DC voltage from the light energy to the sum-up RF voltage after the injection-locked oscillating circuit to a corresponding output direct-current voltage to an output terminal by using the rectifier circuit In one preferred embodiment, any harmonic component of the rectified voltage having frequency higher than the cut-off frequency are further filtered out and any direct current component of the rectified voltage are further passed by using a low pass filter during the step of using a rectifier circuit to receive and rectify in accordance with both the second input direct-current voltage and the RF voltage for generating and outputting a rectified voltage.

In one preferred embodiment, a voltage-multiplying circuit is further used to receive and multiply the rectified voltage for generating and transmitting the multiplied voltage to the low pass filter which filters out any harmonic component of the multiplied voltage having a frequency higher than the cut-off frequency and passes any direct current component of the multiplied voltage during the step of receiving and rectifying in accordance with both the second input direct-current voltage and the RF voltage for generating and outputting a rectified voltage.

The benefit of the present invention is to make full use of the energy in the surrounding environment. In case of sufficient light source, the invention may harvest both light energy and radio frequency energy simultaneously. Thus, the problem of poor conversion efficiency of conventional mixed energy system may be improved, and the efficiency of harvesting energy may be improved. In case of un-sufficient light source, the invention may be deducted to the conventional RF energy harvesting mode to continuously harvest the surrounding environmental RF energy.

DETAILED DESCRIPTION OF THE INVENTION

The detailed description and preferred embodiments of the invention will be set forth in the following content, and provided for people skilled in the art to understand the characteristics of the invention.

Figure 1:
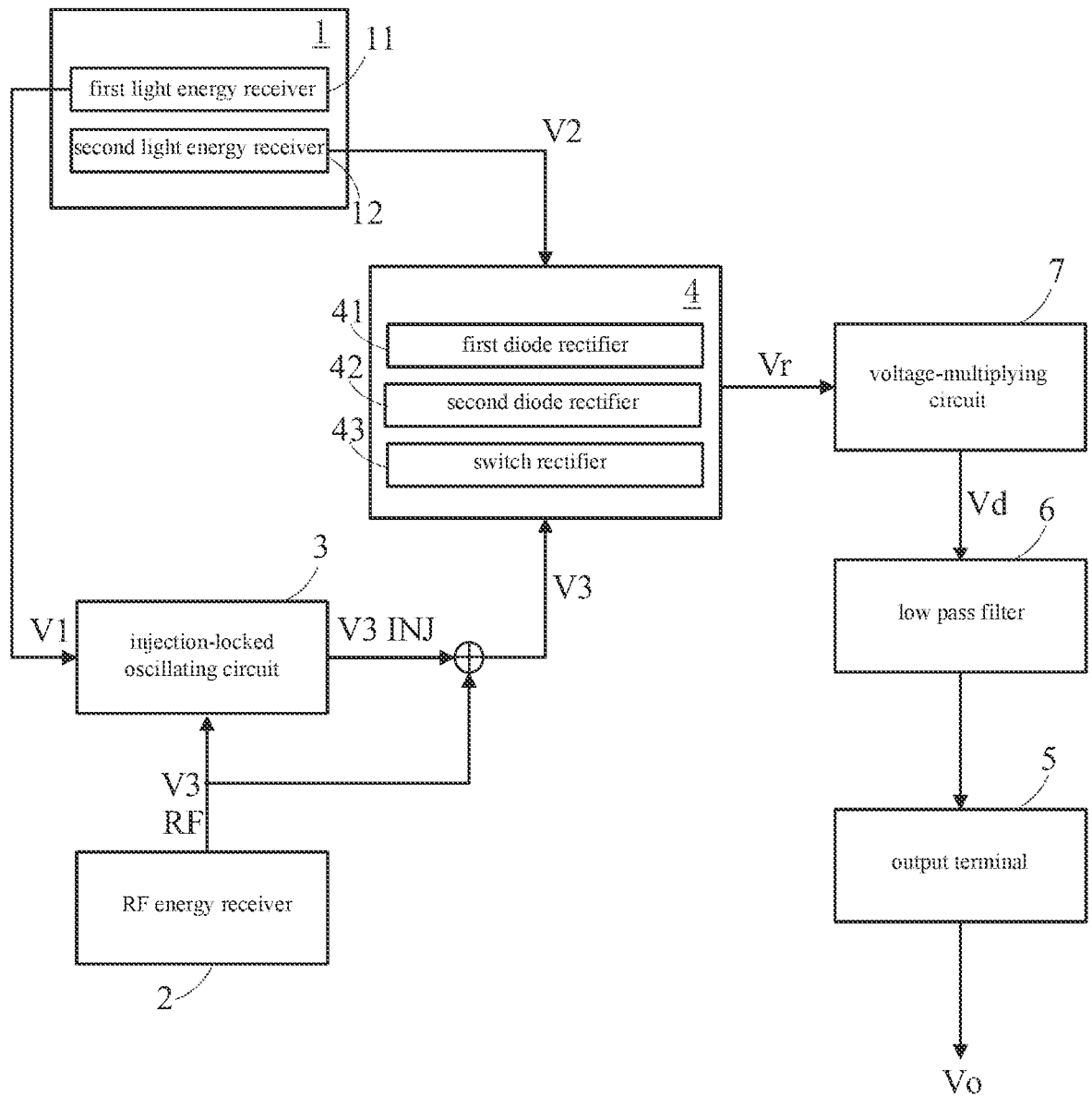
FIG. 1 is a functional block diagram according to one embodiment of the invention.

Refer to FIG. 1 which is the functional block diagram according to one embodiment of the invention. As shown in FIG. 1, the light energy and RF energy harvesting rectifier circuit proposed by the invention includes light energy receiver 1, RF energy receiver 2, injection-locked oscillating circuit 3 and rectifier circuit 4. The detailed description is present below.

In this embodiment, light energy receiver 1 may be photovoltaic cell, or even any other device capable of receiving light and then generating voltage consequently. In one embodiment, light energy receiver 1 includes first light energy receiver 11 and second light energy receiver 12. Light energy may be converted by first light energy receiver 11 to be first input direct-current voltage V1 and also may be converted by second light energy receiver 12 to be second input direct-current voltage V2. First input direct-current voltage V1 is used to drive injection-locked oscillating circuit 3 and second input direct-current voltage V2 is transmitted to rectifier circuit 4 for rectifying.

In this embodiment, RF energy receiver 2 may be antenna. RF energy may be converted by RF energy receiver 2 to be RF voltage V3. RF voltage V3 RF combines with the output voltage of injection-locked oscillating circuit V3 INJ to form a RF voltage V3 which is transmitted to rectifier circuit 4 for rectifying.

Injection-locked oscillating circuit 3 is electrically connected to both light energy receiver 1 and RF energy receiver 2 for receiving first input direct-current voltage V1, RF voltage V3 RF and RF frequency. In this embodiment, first input direct-current voltage V1 may drive injection-locked oscillating circuit 3. Anyway, in the situation that light is in-sufficient and then light energy receiver 1 cannot receive light energy well, first input direct-current voltage V1 is not enough to drive injection-locked oscillating circuit. In the situation, injection-locked oscillating circuit 3 does not work and then only RF energy receiver 2 receives RF energy. Wherein, injection-locked oscillating circuit 3 may be N-type metal-oxide-semiconductor field effect transistor cross-coupled oscillating circuit or P-type metal-oxide-semiconductor field effect transistor cross-coupled oscillating circuit.

Rectifier circuit 4 is electrically to light energy receiver 1 and injection-locked oscillating circuit 3. Rectifier circuit 4 includes first diode rectifier 41, second diode rectifier 42 and switch rectifier 43. Wherein, first diode rectifier 41 and second diode rectifier 42 may receive second input direct-current voltage V2 and RF voltage V3 and then rectify correspondingly for generating rectified voltage Vr. Wherein, switch rectifier 43 receives rectified voltage from both the first diode rectifier output and the second diode rectifier output and then generate a rectified voltage Vr and related harmonic frequencies so as to generate and output corresponding output direct-current voltage Vo to output terminal 5.

In one embodiment, rectifier circuit 4 may be constructed by N-type metal-oxide-semiconductor field effect transistor cross-coupled pair circuit, P-type metal-oxide semiconductor field effect transistor cross-coupled pair circuit, differential complementary metal-oxide-semiconductor rectifier circuit, diode rectifier circuit or any combination thereof.

In one embodiment, low pass filter 6 is further used to be electrically connected to rectifier circuit 4. Wherein, low pass filter 6 has a cut-off frequency so as to filter out any harmonic component of the rectified voltage having a frequency higher than the cut-off frequency so as to acquire a stable output direct-current voltage and then output filtered rectified voltage 5 to output terminal 5 for generating and outputting output direct-current voltage Vo.

In one embodiment, voltage-multiplying circuit 7 is further used to be electrically connected to rectifier circuit 4 and the low pass filter 6 respectively so as to receive and multiply the rectified voltage for generating and transmitting multiplied voltage Vd to the low pass filter 6. Wherein, low pass filter 6 filters out or degrades any harmonic component of multiplied voltage Vd whose frequency is higher than the cut-off frequency and passes any direct current component of multiplied voltage Vd. The filtered multiplied voltage Vd is outputted to output terminal 5 for generating and outputting corresponding direct-current voltage Vo.

Furthermore, in another embodiment, voltage-multiplying circuit 7 further includes a number of rectifiers. Wherein, amount of these rectifiers are decided in according to the required magnification. In an ideal situation, the usage of N rectifiers means N times voltage to be outputted. In a preferred embodiment, the amount of the rectifiers is not larger than 3. But the invention is not limited thereof.

Figure 2:
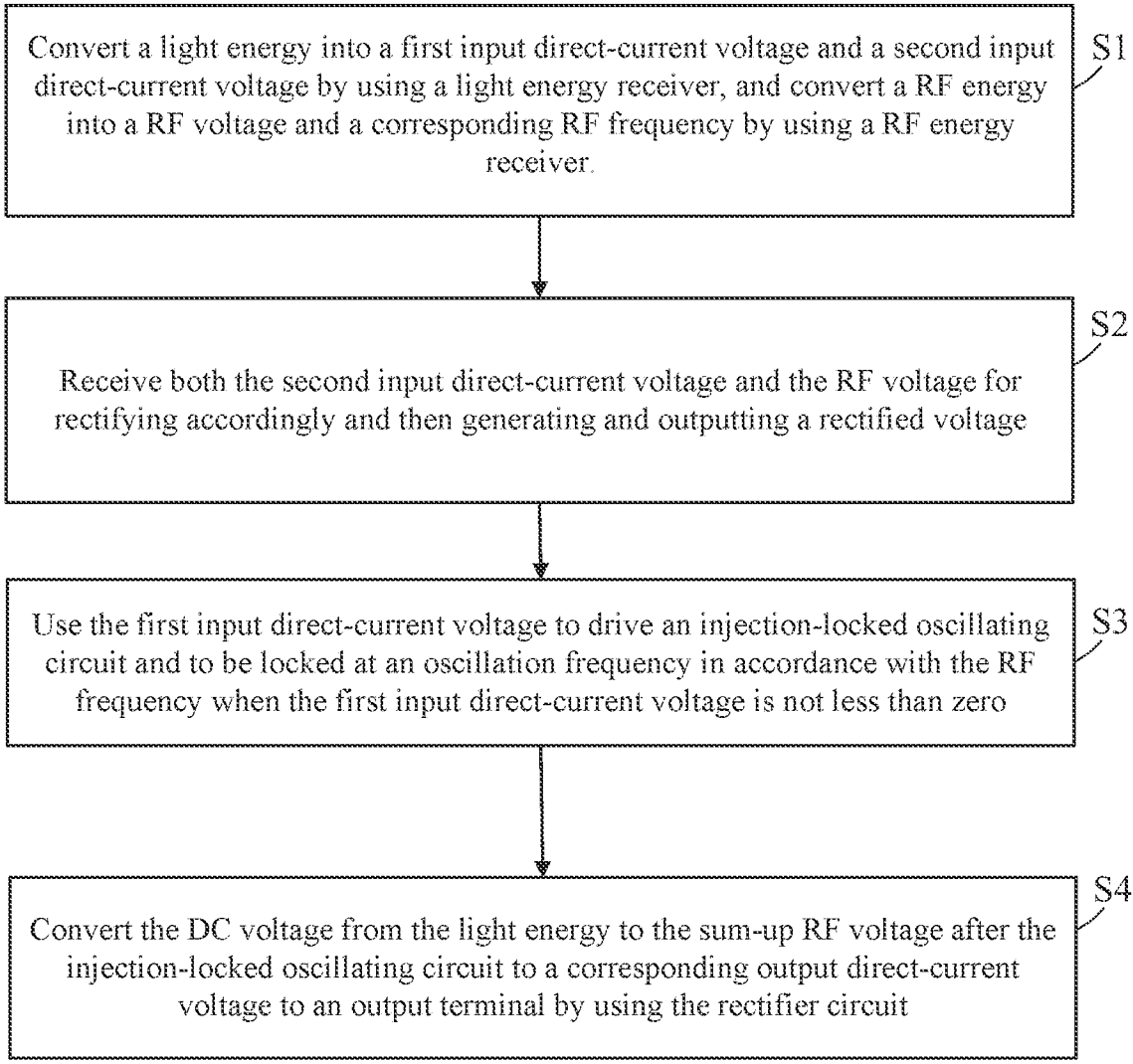
FIG. 2 is a method flowchart according to one embodiment of the invention.
Figure 3:
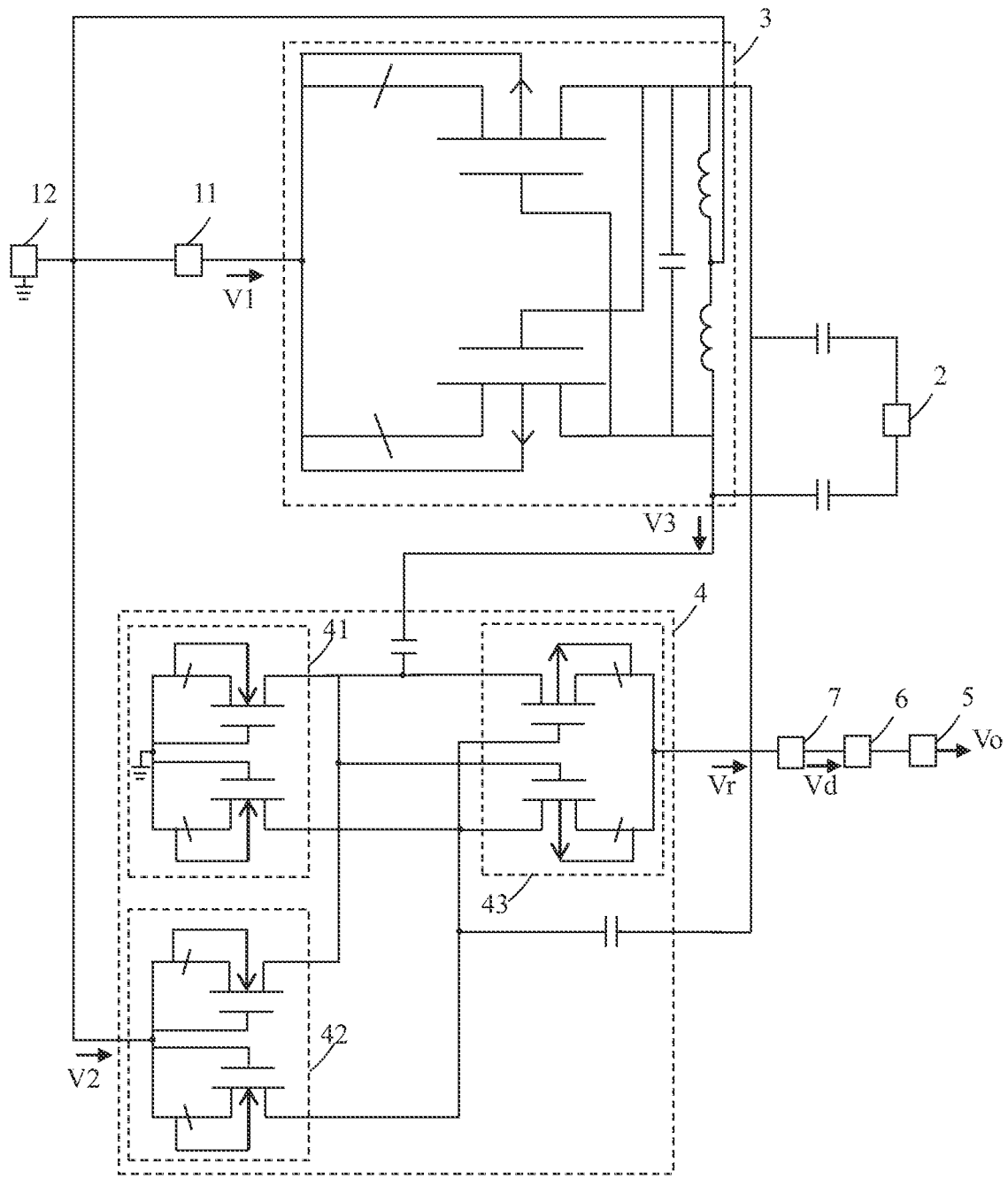
FIG. 3 is a circuit block diagram according to one embodiment of the invention.

To further describe how the invention is implemented, FIG. 2 and FIG. 3 present method flowchart and circuit diagram respectively according to one embodiment of the invention. As shown, the light energy and RF energy harvesting rectification method proposed by the invention includes the following steps:

Step S1: convert a light energy into a first input direct-current voltage and a second input direct-current voltage by using a light energy receiver, and convert a RF energy into a RF voltage and a corresponding RF frequency by using a RF energy receiver.

Step S2: receive both the second input direct-current voltage and the RF voltage for rectifying accordingly and then generating and outputting a rectified voltage.

Step S3: use the first input direct-current voltage to drive an injection-locked oscillating circuit and to be locked at an oscillation frequency in accordance with the RF frequency when the first input direct-current voltage is not less than zero.

Step S4: Convert the DC voltage from the light energy to the sum-up RF voltage after the injection-locked oscillating circuit to a corresponding output direct-current voltage to an output terminal by using the rectifier circuit.

As shown in step S1, light energy receiver 1 receives light energy and then converts it to first input direct-current voltage V1 and second input direct-current voltage V2. Also, RF energy receiver 2 receives RF energy and then converts it to RF voltage V3 INJ and corresponding RF frequency.

As shown in step S2, after previous step, second input direct-current voltage V1 and RF voltage V3 are transmitted to rectifier circuit 4 and then are rectified by rectifier circuit 4 for outputting rectified voltage Vr. In one embodiment, low pass filter 6 may be further used to filter out or degrade any harmonic component of rectified voltage Vr having frequency higher than the cut-off frequency and pass any direct current component of rectified voltage Vr. In another embodiment, voltage-multiplying circuit 7 may be used to receive and multiply rectified voltage Vr, wherein multiplied voltage Vd is generated and transmitted to low pass filter 6, also wherein low pass filter 6 filters out or degrades any harmonic component of multiplied voltage Vd whose frequency is higher than the cut-off frequency and passes any direct current component of multiplied voltage Vd.

As shown in step S3, when first input direct-current voltage V1 is not smaller than zero, first input direct-current voltage V1 may be used to drive injection-locked oscillating circuit 3 such that injection-locked oscillating circuit 3 receives and then locks oscillating frequency according to RF frequency. In this embodiment, when first input direct-current voltage is smaller than zero which means light energy is un-sufficient and then has to be changed to the conventional RF energy harvesting most for harvesting RF energy only. In this situation, rectifier circuit 4 outputs rectified voltage Vr to output terminal 5 such that output terminal 5 generates and outputs output direct-current voltage Vo.

As shown in step S4, rectifier circuit 4 may convert the DC voltage from the light energy and the sum-up RF voltage after the injection-locked oscillating circuit in accordance with oscillating frequency such that it is transmitted to output terminal 5 after amplitude being amplified and direct-current voltage Vo is generated correspondingly and outputted. Although the invention is not limited thereof.

Summarize shortly, the light energy and RF energy harvesting rectifier circuit and corresponding rectification method proposed by the invention use both light energy receiver and RF energy receiver to harvest different environmental energies respectively. Besides, by using injection-locked oscillating circuit to further lock oscillating frequency, the conversion efficiency of hybrid energy may be improved significantly.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light energy and RF energy harvesting rectifier circuit, comprising:
 a first light energy receiver, which receives and converts a light energy into a first input direct-current voltage;
 a second light energy receiver, which receives and converts the light energy into a second input direct-current voltage;
 a RF energy receiver, which receives and converts a RF energy into a RF voltage and a corresponding RF frequency;
 an injection-locked oscillating circuit, which is connected to both the first light energy receiver and the RF energy receiver respectively so as to receive the first input direct-current voltage, the RF voltage and the RF frequency and then use the first input direct-current voltage to drive the injection-locked oscillating circuit and lock an oscillation frequency in accordance with the RF frequency; and
 a rectifier circuit, which is connected to both the second light energy receiver and the injection-locked oscillating circuit respectively and includes a first diode rectifier, a second diode rectifier and a switch rectifier, wherein both the first diode rectifier and the second diode rectifier receive both the second input direct-current voltage and the RF voltage so as to rectify accordingly for generating and outputting a rectified voltage, wherein the switch rectifier receives both the rectified voltage and the oscillation frequency so as to convert the DC voltage from the light energy to the sum-up RF voltage after the injection-locked oscillating circuit to a corresponding output direct-current voltage to an output terminal by using the rectifier circuit.

2. The light energy and RF energy harvesting rectifier circuit according to claim 1, further comprising a low pass filter being connected to the rectifier circuit, wherein the low pass filter having a cut-off frequency so as to filter out any harmonic component of the rectified voltage whose frequency is higher than the cut-off frequency and pass any direct current component of the rectified voltage.

3. The light energy and RF energy harvesting rectifier circuit according to claim 2, further comprising a voltage-multiplying circuit which is electrically connected to the rectifier circuit and the low pass filter respectively so as to receive and multiply the rectified voltage for generating and transmitting the multiplied voltage to the low pass filter, wherein the low pass filter filters out any harmonic component of the multiplied voltage whose frequency is higher than the cut-off frequency and passes any direct current component of the multiplied voltage.

4. The light energy and RF energy harvesting rectifier circuit according to claim 1, wherein the injection-locked oscillating circuit has a P-type metal-oxide-semiconductor field effect transistor cross-coupled oscillating circuit.

5. A light energy and RF energy harvesting rectifier circuit, comprising:
 a light energy receiver, which receives and converts a light energy into a first input direct-current voltage and a second input direct-current voltage;
 a RF energy receiver, which receives and converts a RF energy into a RF voltage and a corresponding RF frequency;
 an injection-locked oscillating circuit, which is connected to both the light energy receiver and the RF energy receiver respectively so as to receive the first input direct-current voltage and the RF frequency and then use the first input direct-current voltage to drive the injection-locked oscillating circuit and lock an oscillation frequency in accordance with the RF frequency when the first input direct-current voltage is not less than zero; and
 a rectifier circuit, which is connected to both the light energy receiver and the injection-locked oscillating circuit respectively so as to receive both the second input direct-current voltage and the RF voltage for rectifying accordingly and then generating and outputting a rectified voltage, wherein the rectifier circuit adjusts an amplitude of the rectified voltage according to the oscillation frequency for generating and outputting a corresponding output direct-current voltage to an output terminal.

6. The light energy and RF energy harvesting rectifier circuit according to claim 5, wherein the light energy receiver includes a first light energy receiver and a second light energy receiver, wherein the first light energy receiver receives and converts the light energy into a first input direct-current voltage and wherein the second light energy receiver receives and converts the light energy into a second input direct-current voltage.

7. The light energy and RF energy harvesting rectifier circuit according to claim 5, further comprising a low pass filter being connected to the rectifier circuit, wherein the low pass filter having a cut-off frequency so as to filter out any harmonic component of the rectified voltage whose frequency is higher than the cut-off frequency and pass any direct current component of the rectified voltage.

8. The light energy and RF energy harvesting rectifier circuit according to claim 7, further comprising a voltage-multiplying circuit which is electrically connected to the rectifier circuit and the low pass filter respectively so as to receive and multiply the rectified voltage for generating and transmitting the multiplied voltage to the low pass filter, wherein the low pass filter filters out any harmonic component of the multiplied voltage whose frequency is higher than the cut-off frequency and passes any direct current component of the multiplied voltage.

9. The light energy and RF energy harvesting rectifier circuit according to claim 5, wherein the injection-locked oscillating circuit has a p-type metal-oxide-semiconductor field effect transistor cross-coupled oscillating circuit.

10. The light energy and RF energy harvesting rectifier circuit according to claim 5, wherein the rectifier circuit is a diode rectifier circuit.

11. A light energy and RF energy harvesting rectification method, comprising:
 converting a light energy into a first input direct-current voltage and a second input direct-current voltage by using a light energy receiver, and converting a RF energy into a RF voltage and a corresponding RF frequency by using a RF energy receiver;
 receiving both the second input direct-current voltage and the RF voltage for rectifying accordingly and then generating and outputting a rectified voltage by using a rectifier circuit;
 using the first input direct-current voltage to drive an injection-locked oscillating circuit and lock an oscillation frequency in accordance with the RF frequency when the first input direct-current voltage is not less than zero; and adjusting an amplitude of the rectified voltage according to the oscillation frequency for generating and outputting a corresponding output direct-current voltage to an output terminal by using the rectifier circuit.

12. The light energy and RF energy harvesting rectification method according to claim 11, further comprising filtering out any harmonic component of the rectified voltage whose frequency is higher than the cut-off frequency and passing any direct current component of the rectified voltage by using a low pass filter during the step of using a rectifier circuit to receive and rectify in accordance with both the second input direct-current voltage and the RF voltage for generating and outputting a rectified voltage.

13. The light energy and RF energy harvesting rectification method according to claim 11, further comprising using a voltage-multiplying circuit to receive and multiply the rectified voltage for generating and transmitting the multiplied voltage to the low pass filter which filters out any harmonic component of the multiplied voltage whose frequency is higher than the cut-off frequency and passes any direct current component of the multiplied voltage during the step of receiving and rectifying in accordance with both the second input direct-current voltage and the RF voltage for generating and outputting a rectified voltage.

* * * * *